United States Patent [19]
Pokorny et al.

[11] Patent Number: 5,706,381
[45] Date of Patent: Jan. 6, 1998

[54] NON-RISING SUBMARINE OPTICAL CABLE

[75] Inventors: Lothar Pokorny, Coburg; Wolfgang Schrey, Neustadt; Ulrich Priesnitz, Coburg; Ulrich Oestreich, München; Lienhard Schneider, Rödental, all of Germany

[73] Assignee: Siemens Aktiengesellschaft, Munich, Germany

[21] Appl. No.: 646,322
[22] PCT Filed: Nov. 10, 1994
[86] PCT No.: PCT/DE94/01328
§ 371 Date: Jul. 17, 1996
§ 102(e) Date: Jul. 17, 1996
[87] PCT Pub. No.: WO95/13556
PCT Pub. Date: May 18, 1995

[30] Foreign Application Priority Data

Nov. 12, 1993 [DE] Germany .................. 43 38 761.6

[51] Int. Cl.⁶ ........................................... G02B 6/44
[52] U.S. Cl. ............................................. 385/100
[58] Field of Search ........................... 385/100, 103, 385/107, 113

[56] References Cited

U.S. PATENT DOCUMENTS

| | | |
|---|---|---|
| 4,703,997 | 11/1987 | Ijiri .......................... 385/109 |
| 4,765,711 | 8/1988 | Obst . |
| 5,054,881 | 10/1991 | Fisher et al. . |

FOREIGN PATENT DOCUMENTS

| | | |
|---|---|---|
| 34 03 086 A1 | 8/1985 | Germany . |
| 2 158 264 | 11/1985 | United Kingdom . |

*Primary Examiner*—Rodney B. Bovernick
*Assistant Examiner*—Robert E. Wise
*Attorney, Agent, or Firm*—Hill, Steadman & Simpson

[57] ABSTRACT

The submarine optical cable has a basic structure which does not prevent rising up. Therefore, the cable is provided with at least one additional element which has a specific weight that is selected to be greater than 2.1 g/cm³ and prevents the rising up of the cable.

14 Claims, 1 Drawing Sheet

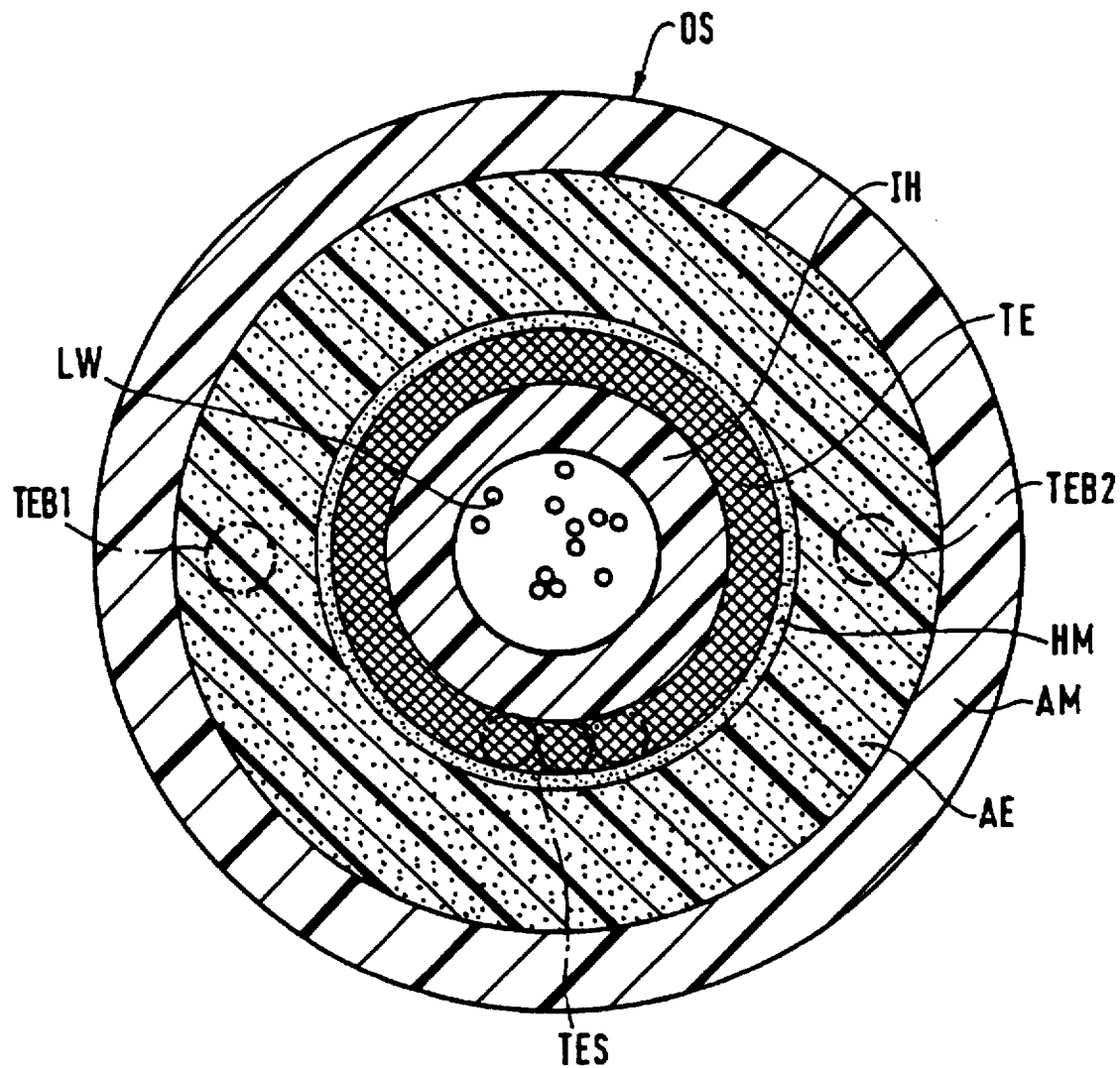

NON-RISING SUBMARINE OPTICAL CABLE

BACKGROUND OF THE INVENTION

The invention relates to a non-rising submarine optical cable with a cable construction, which has a basic structure, that because of the low specific weight, does not prevent rising up, and a provision is made in the cable for at least one additional element, which has a specific weight that is selected to be >2.1 g/cm³ and which has sufficient weight to prevent the rising up of the cable.

A submarine cable of this type has been disclosed by U.S. Pat. No. 4,765,711. If submarine optical cables of extremely light construction are used or if metal-free submarine optical cables are laid, the respective basic structure of such cables often has a specific weight which no long prevents rising up. In this case, basic structure is to be understood as that structure which is needed to fulfill the respective tasks—excluding the prevention of rising up. In the case of the known cable, metal particles are introduced into the cable in order to prevent rising up. Metal particles of this type are relatively difficult to process and are generally not corrosion-proof.

DE 34 03 086 A1 discloses a high-tensile submarine optical cable in which at least one layer of steel wires is stranded onto an inner sheath containing the optical fiber. An outer sheath of plastic material is applied on the outside to these steel wires. Such submarine cables, which are provided with metal armoring, have such a high specific weight that rising up of the cable from the bottom of the sea is prevented, that is to say in the case of embedding of the cable into sand or silt, the cable remains lying in this position protected from the outside by the sand or silt layer lying thereon. Sand or silt have a specific weight of the order of magnitude of 1.6–2.1 g/cm³.

SUMMARY OF THE INVENTION

The invention is based on the object of providing a submarine optical cable in which, rising up is prevented in a simple way. According to the invention, this object is achieved by an improvement of a cable construction which has a basic structure that does not prevent rising up, and the cable construction is provided with at least one additional element which has a specific weight that is selected to be >2.1 g/cm³ and which prevents the rising up of the cable. The improvement is that the additional element contain at least one metal oxide. In the case of the invention, an additional element in the form of a metal oxide is thus provided, and the specific weight of the metal oxide is selected to be sufficiently large that the submarine cable remains embedded, for example in sand or silt, or in the case of the cable laying on the bottom of the sea, the cable gradually becomes buried in the bottom of the sea. This has the advantage that improved protection for the cable is then guaranteed and, in addition, the possibility of location or damage is reduced. The cable can be produced in a simple way. Since no metal parts are used, the possibility of location is also reduced.

The metal oxide may be an iron oxide or a lead oxide. The additional element may contain a sintered compound or may be at least one powdered material embedded in a matrix that consists of a thermoplastic material. The additional element may have a tubular design, may have a strand-shaped design and may be located underneath an outer sheath. The specific weight of the entire optical cable is selected to be greater than 2.3 g/cm³. The specific weight of the basic structure free of the additional element lies below 2.1 g/cm³. The specific weight of the additional element are selected to be greater than 3.5 g/cm³ and preferably greater than 4 g/cm³.

BRIEF DESCRIPTION OF THE DRAWING

The FIGURE is a transverse cross-sectional view of the submarine cable of the present invention.

DESCRIPTION OF THE PREFERRED EMBODIMENTS

The principles of the present invention are incorporated in a submarine optical cable generally indicated at OS. The submarine optical cable OS has a cable core which is formed by an (if appropriate, multilayer) inner sleeve IH, in the interior of which there are arranged a number of optical fibers LW. These optical fibers LW are normally embedded in a soft filling compound, not shown here. Over this, a layer of high-tensile material TE is provided, and plastic materials such as aramid yarns or the like are preferably used for this layer. After this there follows a hot-melt adhesive layer HM. Provided on the outside is a single- or multilayer outer sheath AM. The above-described elements LW, IH, TE, HM and AM form the basic structure of the submarine optical cable OS, that is to say these elements would be intrinsically sufficient to guarantee the full serviceability of the submarine optical cable OS in terms of transmission, laying and operation.

As a result of the basic structure of the submarine optical cable OS being constructed in a virtually metal-free manner, said cable has a low specific weight which lies below the value of about 2.1 g/cm³, so that rising up occurs, that is to say the cable OS does not ended itself in the bottom of the sea or, in spite of embedding being carried out during the laying, can be conveyed gradually once more to the surface of the bottom of the sea, for example as a result of sea currents or the like.

In order to prevent this, in addition to the elements LW, IH, TE, HM and AM, supplementing the basic structure, there is provided an additional element AE which, in the present example, is of tubular design and is arranged between the hot-melt adhesive layer HM and the outer sheath AM. This additional element AE is constructed from a material with a sufficiently high specific weight, that is to say it consists wholly or in part of such relatively heavy materials. The additional element AE, insofar as the strength and transmission properties of the cable OS are concerned, has no additional task. Rather, it is used solely to increase the specific weight. As a whole, the specific weight of the additional element AE should be expediently selected to be greater than 3.5, preferably greater than 4 g/cm³. In particular, metal oxides, which generally have quite high specific weights, come into consideration as materials. Preferably, lead oxide ("litharge"—specific weight 9.3 g/cm³) or iron oxide (specific weight 5.4 g/cm³) can be used. The use of sintered compounds (for example titanate compounds—specific weight 3.5–5.3 g/cm³), and if appropriate also a mixture of corresponding metal oxides is also conceivable.

While the basic structure, that is to say the elements LW, IH, TE, HM and AM, has a specific weight $\gamma$<2.1 g/cm³, by means of the arrangement of the additional element AE the specific weight of the entire cable OS is increased to such an extent that said specific weight is at least $\gamma$>2.1 g/cm³. Preferably, the value for $\gamma$ of the entire optical cable OS should be at least $\gamma$=2.3 g/cm³, a range between 2.4 and 3.0 g/cm³ being particularly expedient.

It is advantageous to use no metallic parts (for example wires or the like) for the construction of the additional element AE, since elements of this type in submarine cables can be detrimentally affected by corrosion. In addition, cable constructions containing metal, that is to say non-dielectric cable constructions, are disadvantageous whenever easy location of such cables is undesirable.

In particular, powdered materials, such as the already mentioned metal Oxides or sintered materials, come into consideration as materials for the construction of the additional element AE. Nevertheless, to guarantee a definite consistency for the additional element AE, it is expedient to embed these materials in a matrix, thermoplastics such as, for example, polyethylene, polyvinylchloride, thermoplastic olefins or thermoplastic elastomers being especially suitable for this matrix. In this way, the tubular additional element AE can be applied during the production process of the cable OS by extrusion onto the cable core, and the additional element AE is itself also sufficiently elastic and pressure-stable and forms a good underlayer for the outer sheath AM which is to be applied.

The material (for example the metal oxide), serving to make the cable heavier, of the additional element AE should make up at least 50% by weight, preferably between 60 and 90% by weight, of the additional element. The remainder would then essentially be, in each case, matrix material.

It is also possible to design the additional element AE in the form of strands or the like and to strand these on the underlying part of the cable core, which is illustrated in the figure by means of the strands TES which are drawn with a dash-dotted line.

Finally, if appropriate it is also possible to embed further high-tensile elements at the same time into the additional element AE, as is illustrated by the strands TEB1 and TEB2, preferably likewise consisting of plastic material, which are arranged diametrically opposite in the additional element AE. These high-tensile elements TEB1 and TEB2 expediently consist of aramid yarns, carbon fibers, LCP or the like, that is to say of non-conductive parts. Hence, even in this configuration, a fully dielectric construction of the entire optical cable OS is guaranteed.

It is expedient to fit the additional element AE within the outer sheath AM, to be precise preferably directly underneath the outer sheath AM. This has the advantage that, because of the greater diameter range at a specific wall thickness of the additional element AE, a particularly large influence can be had on the specific weight of the entire cable.

The internal construction, that is to say the structure in which the optical fibers LW are arranged, can be modified in many ways, that is to say it does not have to be a maxi-bundle construction, as shown, in which a plurality of optical fibers are arranged loosely in a filling compound inside a tube IH. Also conceivable for the optical fibers are a layer construction, for example stranded onto a high-tensile element, a construction in the form of a chamber cable or the like.

We claim:

1. In a non-rising submarine optical cable with a cable construction with a basic structure having a low specific weight, which does not prevent rising up, the cable being provided with at least one additional element with a specific weight which is selected to be $>2.1$ g/cm$^3$ and which prevents the rising up of the cable, the improvement comprising the additional element containing at least one metal oxide.

2. In a non-rising submarine optical cable according to claim 1, wherein the additional element contains lead oxide.

3. In a non-rising optical cable according to claim 2 wherein the metal oxide of the additional element is a mixture of lead oxide and iron oxide.

4. In a non-rising submarine optical cable according to claim 1 wherein the additional element contains iron oxide.

5. In a non-rising submarine optical cable according to claim 1, wherein the additional element contains a sintered compound.

6. In a non-rising submarine optical cable according to claim 1, wherein a specific weight of the entire optical cable is selected to be $>2.3$ g/cm$^3$.

7. In a non-rising submarine optical cable according to claim 1, wherein the low specific weight of the basic structure of the optical cable without the additional element lies below 2.1 g/cm$^3$.

8. In a non-rising submarine optical cable according to claim 1, wherein the specific weight of the additional element is selected to be $>3.5$ g/cm$^3$.

9. In a non-rising optical cable according to claim 8, wherein the specific weight of the additional element is $>4$ g/cm$^3$.

10. In a non-rising submarine optical cable according to claim 1, wherein the additional element contains at least one powdered material embedded in a matrix.

11. In a non-rising submarine optical cable according to claim 10, characterized in that wherein the matrix consists of a thermoplastic material.

12. In a non-rising submarine optical cable according to claim 1, wherein the additional element is of tubular design.

13. In a non-rising submarine optical cable according to claim 1, wherein the additional element is of a strand-shaped design.

14. In a non-rising submarine optical cable according to claim 1, wherein the additional element is arranged within an outer sheath.

* * * * *